May 24, 1927.

B. S. AIKMAN 1,629,815

MAGNETIC UNLOADER

Filed June 23, 1922

Inventor
Burton S. Aikman
By Brown, Boettcher & Dienner
Attorneys

May 24, 1927.

B. S. AIKMAN 1,629,815

MAGNETIC UNLOADER

Filed June 23, 1922

Inventor
Burton S. Aikman
By Brown Boettcher & Dienner
Attorneys

May 24, 1927.

B. S. AIKMAN 1,629,815

MAGNETIC UNLOADER

Filed June 23, 1922

Inventor
Burton S. Aikman
By
Attorneys

Patented May 24, 1927.

1,629,815

UNITED STATES PATENT OFFICE.

BURTON S. AIKMAN, OF MILWAUKEE, WISCONSIN, ASSIGNOR TO NATIONAL BRAKE & ELECTRIC CO., OF MILWAUKEE, WISCONSIN, A CORPORATION OF WISCONSIN.

MAGNETIC UNLOADER.

Application filed June 23, 1922. Serial No. 570,319.

My invention relates to protective devices for electric circuits, and more particularly for the motor therein. While I have shown and described my invention particularly as applied to pneumatic systems having a motor driven compressor, the invention is not to be limited to such use.

It is true that the invention is peculiarly adapted to employment as an unloader for pneumatic systems, as will be later apparent, but it is to be understood that the invention is also valuable for general utility work in the form of an operating relay or controller.

In pneumatic systems, the fluid pressure is apt to rise to a point where the entire equipment would be damaged if permitted to continue. Generally the motor will be stalled before any damage is done to the tank or pipes. Hence, provision should primarily be made to care for the motor. Heretofore it has been the general practice to provide pop valves, serving to relieve the system of excessive pressure. Pop valves often stick. Even if the pop valve operates, the motor must operate the compressor against maximum load wasting power and overheating the motor. The invention is particularly adapted for use in connection with alternating current motors which have low starting torque although the invention is not limited to such use.

My invention employs a magnetic device connected in the motor circuit. The magnetic device comprises two armatures and two gaps in series relation functioning to control the actuation of the suction valve of the compressor, according to the current flow in the motor circuit. I accomplish this by arranging the various elements in the form of an unloader which is magnetically operated and governed by the electrical condition of the motor circuit. In the idle condition the unloader blocks the suction valve open. Hence, if the discharge valve is leaky, the cylinder will not stand under pressure. If the cylinder stood under pressure it would be difficult to depress the inlet valve to unload. Hence, I provide an organization of elements which permits unloading when the current is either above normal or below normal. The unloader functions to unload the system upon initial operation. As the motor comes to speed, the current drops and the unloader permits the compressor to load. If the pressure rises too high while the system is in operation, a resultant overload is thrown upon the motor, causing the current to build up and actuate the unloader. The system will be automatically unloaded and then if the electrical condition becomes normal the unloader will again apply this load to the motor.

In the accompanying drawings which form a part of the present specification, I have illustrated one embodiment in which my invention may appear.

Figure 1:
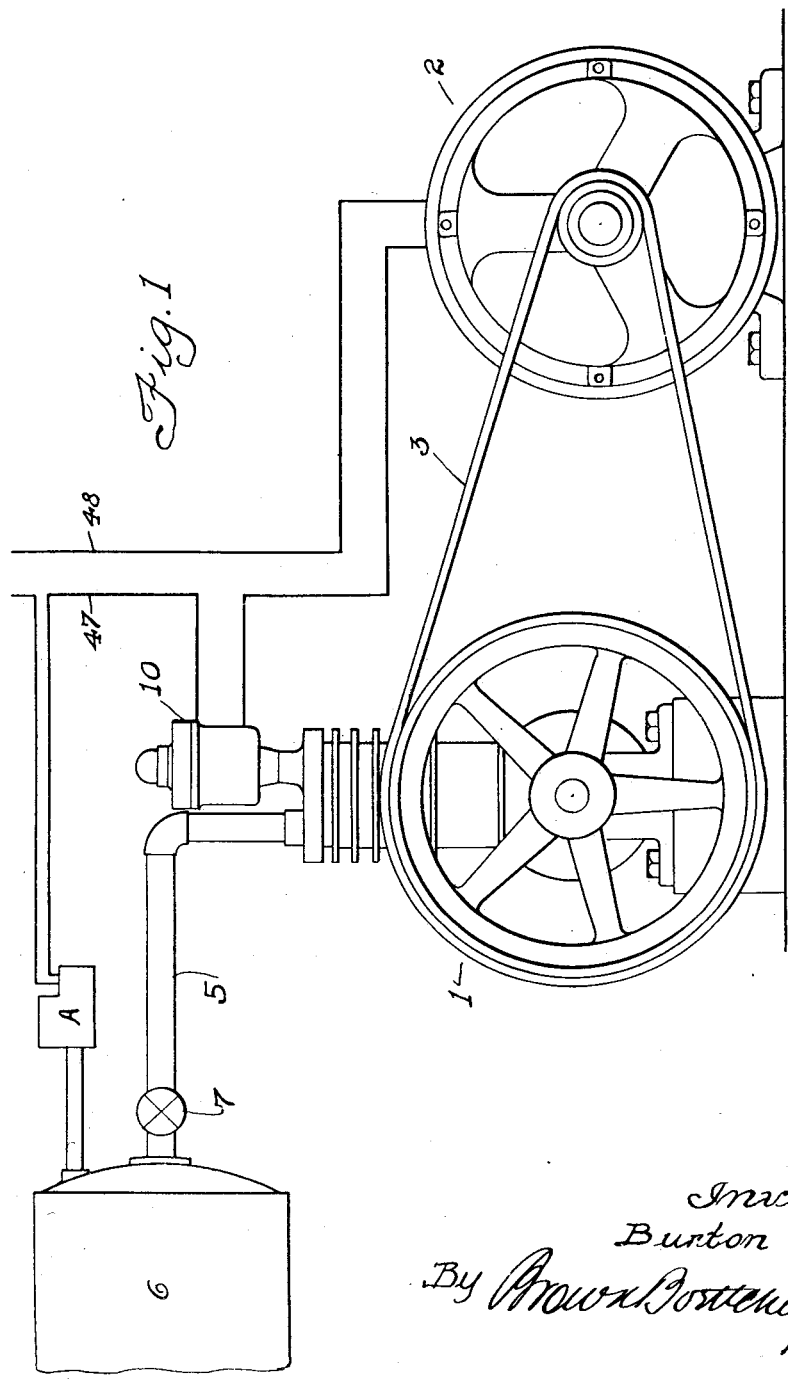
Figure 1 is a diagrammatic layout of a compressing system embodying my invention.

For the purposes of illustration, my invention is embodied in connection with an air compressor system, comprising the compressor 1 driven by an electric motor 2 through the belt 3. The compressor is provided with the usual air inlet check valve and air discharge check valve, the latter communicating through the pipe 5 with the main reservoir 6. A check valve 7 in the pipe 5 prevents the air pressure from leaking back through the compressor 1 from the reservoir 6.

The operation of this system is well known. Air is compressed in the compressor and is discharged into the pipe 5. The motor circuit comprising the line wires 47 and 48, has a pressure controlled switch A which opens and closes the circuit. When the air reaches a predetermined pressure in the reservoir 6, the switch A opens to break the motor circuit. The motor stops and remains inactive. When the air pressure drops to a predetermined minimum the switch A closes the circuit again.

Figure 2:
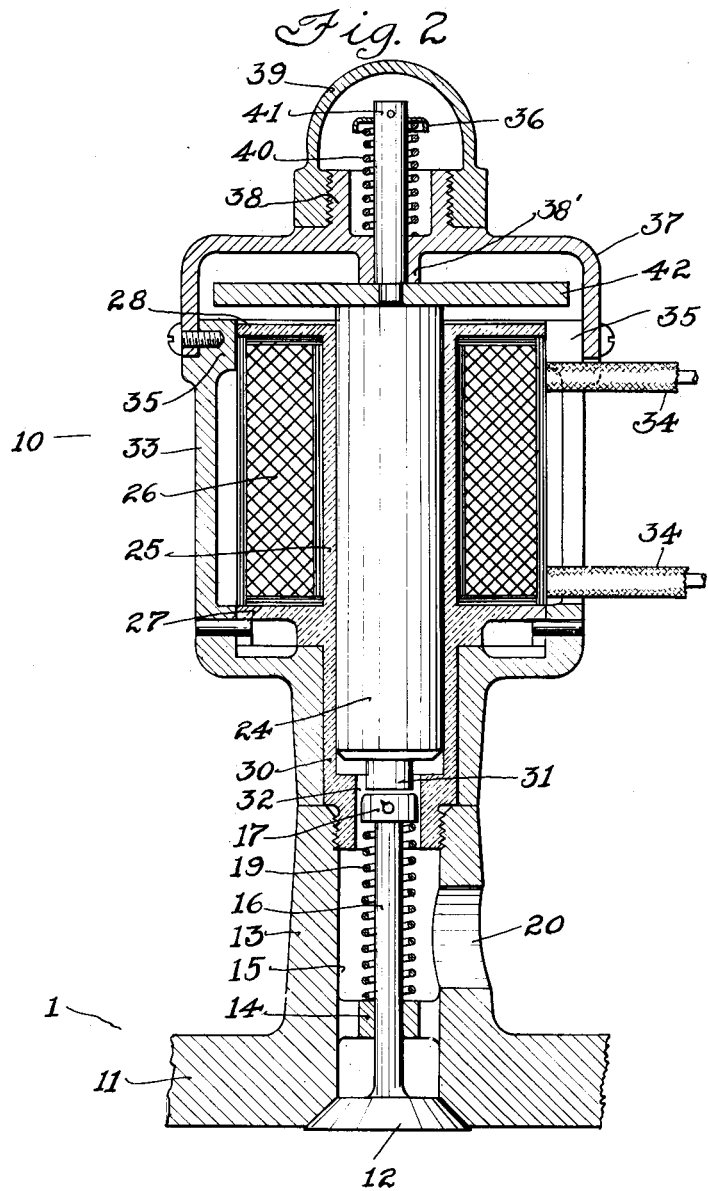
Fig. 2 is a vertical cross section of the magnetic unloader and part of the air compressor to illustrate the suction valve.

Upon initial operation it is desirable that the compressor be unloaded, so that the first several turn-overs be made under practically no load. The unloader 10 is employed to unload the compressor upon starting. The unloader is actuated by the initial rush of current which is considerably higher than the normal flow. The unloader 10 is in direct connection with the suction valve 12 of the compressor 1, as shown in Figure 2, and is magnetically operated, so that the unseating of the valve 12 is controlled by the electrical condition of the motor circuit.

The unloader 10 is suitably carried upon the compressor 1 on a boss 13 on the head 11. This boss is internally threaded to receive the lower threaded end of the unloader. The boss 13 is provided with a guide 14 intermediate the ends of the valve passage 15. The valve 12 has a stem 16, bearing a head 17 at its outer end. This head 17 is fastened on the end of the stem after the stem 16 has passed through the guide 14. An expansion spring 19 surrounds the valve stem 16, bearing at one end against the head 17, and at the other end against the guide 14. Normally, the suction valve will remain seated because of the spring 19, but will be drawn away from its seat on each suction stroke of the compressor. Air is admitted through the port 20 provided in the boss 13, and is drawn into the compressor in the usual manner.

The magnetic circuit of the unloader comprises the plunger 24 and the armature disk 42 separated by a gap when the circuit is inactive. The solenoid winding 26 surrounds the plunger 24. The magnetic casing 33 completes the magnetic circuit. The plunger 24 is carried axially within the spool 25, which is preferably made of non-magnetic material. The winding 26 is wrapped around the spool 25 between the flanges 27 and 28, and the lower end of the spool 25 is extended from the lower flange 27 to form a guide for the lower end of the plunger 24. An extension 31 is provided on the plunger 24 and it extends into the reduced passage 32 in order to be able to engage the head 17. Reducing the passage, in which the plunger 24 operates, provides a stop for the plunger on its downward stroke, thereby limiting its movement and the distance which the valve 12 may be moved from its seat. This prevents any possible interference with the piston head.

The spool 25 is suitably carried within the magnetic casing 33. The upper end of the casing 33 is formed with an enlarged shoulder 35 having its outer edge recessed or grooved to receive the lower edge of the cap 37. An externally threaded boss 38 extends centrally from the top face of the cap 37, and over this boss 38 is provided a smaller cap 39. The boss 38 is cored in order to receive an expansion spring 40 surrounding a stem 41. The spring 40 is placed under tension by means of a suitable stop 36 near the upper end of the stem. The lower end of the stem 41 passes loosely through the cap 37. This end is reduced and is inserted into the armature disk 42. Normally the spring 40 holds the armature 42 against the boss 38′, which provides a gap between the shoulder 35 and between the upper end of the plunger or movable core 24. The armature disk 42 is placed magnetically in series with the plunger 24 and the shell 33. Two gaps are formed in series in the magnetic circuit. One lies between the top of the plunger 24 and the disc 42. The other lies between the rim of disc 42 and the annular shoulder 35. However, the gap between the plunger 24 and armature 42 is destroyed as soon as normal running current passes through the winding 26. The plunger 24 moves upward and is stopped by the armature 42. The spring 40 has sufficient strength to hold the armature 42 in upper position during a predetermined flow of electricity through the winding 26. This, of course, may be varied by the use of springs of different strengths.

The operation is as follows:

The switch A is closed and the motor is started. The motor turns over the compressor so that the air is compressed and discharged into the pipe 5. If the compressing of air is permitted to take place immediately, the load on the motor would be too great. It is preferable that the motor be started up under as little load as possible, and to this end the compressor should be unloaded prior to starting, so that the initial turn-over of the compressor is made under practically no load. The magnetic unloader functions to unload the compressor during this stage of the operation, and the sudden rush of current through the motor circuit when the motor is started, actuates the unloader. The magnetic field of the unloader becomes excited to raise the plunger 24 to upper or energized position where it abuts the armature disc 42. Current will flow through this field by way of the conductor 34 of the motor circuit. The air gap between the plunger and armature 42 is thereby destroyed, but the sudden flow of current which is excessive for the starting torque of the motor causes the frame or shell 33 to become magnetized. The shoulder 35 of the casing 33 then serves as a pole to attract the armature 42. The gap between these two members is consequently destroyed and the spring 40 overcome, the tension of which is ordinarily sufficient to hold the armature 42 in upper position under normal flow of current. The armature 42 pushes the plunger downwardly to its initial position. The valve 12 is consequently unseated to permit the compressor to unload.

The action is comparatively instantaneous, and as soon as the motor comes to speed, the current is normal for the torque, which causes the magnetic field to weaken and deenergize the frame 33. The armature spring 40 lifts the armature 42, and inasmuch as the winding 26 is energized, the plunger is returned to its upper position. The valve 12 is then permitted to seat and function upon each stroke of the compressor.

If the pressure builds up and reaches a predetermined maximum, the pressure switch A operates automatically to open the motor circuit and render the system inactive. However, should the pressure switch A fail to open the circuit automatically, or the valve 7 fail to relieve the system of the pressure, the pressure begins to retard the proper operation of the compressor, which in turn slows down the motor. The current again becomes excessive and causes the unloader 10 to unseat the valve 12. In this instance, the operation of the unloader is substantially the same as before described. Should the pressure remain too high, the unloader 10 holds the compressor 1 open and prevents the system from operating again. Each time the motor speeds up, the current becomes normal and the magnetic field of the unloader is weakened to allow the spring 40 to lift the armature 42, and the plunger to ascend to its energized position. The compressor then tries out the air line, and if the pressure is still high, the overload is returned to the motor. The unloading operation takes place again and will be repeated until the switch A is manually opened, or the pressure lowered.

The plunger 24 is preferably of sufficient weight to hold the valve 12 unseated while the system is inactive. Any air which leaks past the valve 7 and returns to the compressor is prevented from building up to any considerable pressure. Furthermore, this particular action of the plunger, when de-energized, assists in unloading the compressor on initial operation of the motor.

Figure 3:
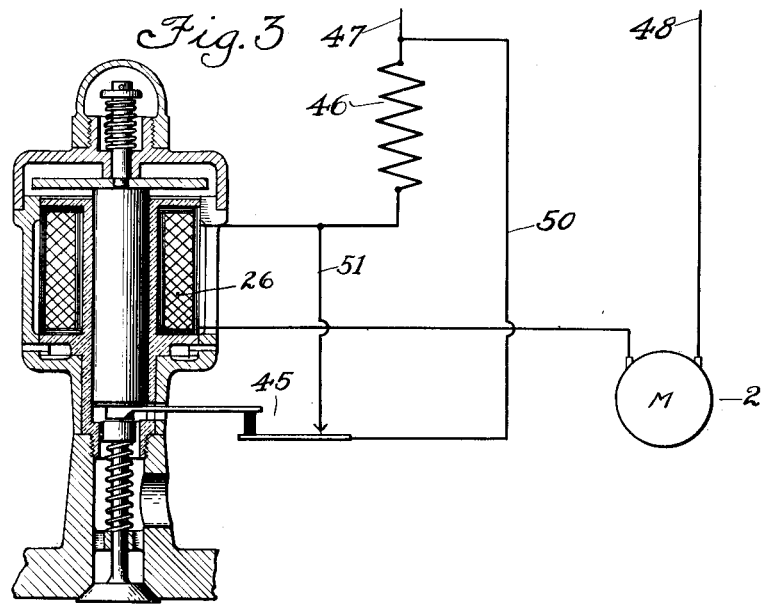
Fig. 3 is a layout of the motor circuit employing an external resistance for the unloader.
Figure 4:
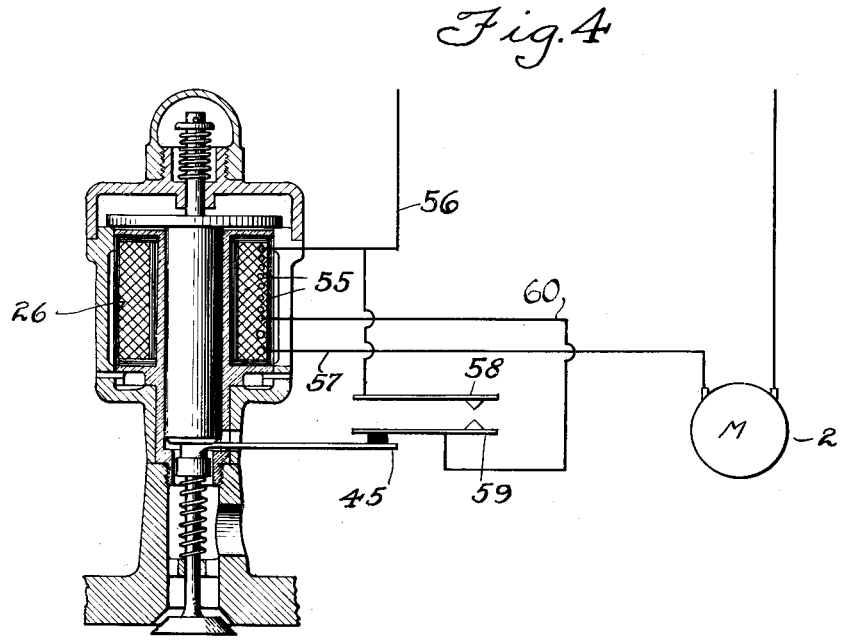
Fig. 4 is a similar layout, but illustrating the unloader provided with an internal resistance.

In Figures 3 and 4, I have shown means for avoiding the excessive rush of current which results from connecting the motor in the supply circuit, by the use of starting compensators. These may be of any suitable type, such as a resistant connected external of the solenoid winding 26, or made a part thereof, for furnishing to the motor circuit current at a lower voltage than that of the supply mains. After the motor has attained the speed appropriate to the higher voltage, the resistance is thrown out and the motor directly connected with the supply mains.

In Figure 3, there is illustrated a diagrammatic layout of the manner of connecting the starting resistance 46 in the motor circuit comprising the line wires 47 and 48. The resistance 46 is preferably placed in the wire 47, so that the current will flow therethrough before reaching the winding 26. But to throw out the starting resistance 46, a shunt 50, switch 45 and wire 51 have been provided, these permitting the current to be fed thru the winding 26 to the motor at the same voltage as at the terminals of the supply mains. The switch 45 is actuated by the movement of the plunger 24, so that, when it is in upper or energized position, the switch will be closed to pass the current around the resistance 46. With the switch closed, the motor will pick up to synchronous speed and drive the compressor for normal operation.

In Figure 4 I have shown the starting resistance inserted in the winding 26. This resistance 55 may be of any suitable type, and arranged in the winding 26 in any desired manner. The motor circuit line wire 56 connects with one end of the resistance 55 and also with the contact 58, while the opposite end of the resistance and one end of the winding 26 connects with the contact 59 by the wire 60. The winding connection is completed by the wire 57 leading to the motor. Thus it will be seen that when the switch 45 is open as shown in Figure 4, the starting resistance 55 will be inserted in the circuit so that a small starting current and large torque will be provided under the load. The operation will occur every time the compressor is unloaded, that is, when the intensity of the magnetic field is increased and the plunger 24 pushed down against the magnetizing force tending to hold it in upper position, by the increased intensity of the magnetic field attracting the armature 42.

The invention resides primarily in the arrangement of the magnetic circuit comprising the unloader, and also in its function as a controller when a change of condition occurs in the motor circuit. It has two distinct movements occurring successively, the first being the result of current in the circuit, and the second the result of an excessive flow of current. One movement of the unloader allows the valve to be self-functioning, that is, operating on each suction stroke of the compressor. The other movement of the unloader forces the valve off its seat until the load on the motor is removed.

I consider the use of this unloader of particular advantage in its present embodiment. It functions automatically to unload the compressor at a time when it is apt to be damaged thru lack of attention. It keeps the compressor unloaded while the system is inactive, and operates immediately to unload the compressor when the pressure reaches beyond a point of safety.

While I have described my invention with reference to the details of a particular embodiment, I do not wish to be limited to the details shown and described, nor to the proportion and dimensions indicated except where I have clearly illustrated that they are essential, as it is apparent that my invention may appear in a variety of forms and modifications.

I claim:

1. In an electropneumatic device, a valve, an electric circuit, movable means for holding said valve in one position and operable by a current of predetermined magnitude in said circuit to become ineffective with respect to said valve and a second movable means operable by a current of different magnitude in said circuit to impel said first movable means to hold said valve in said one position.

2. In an electropneumatic device, a valve loaded to a normal position, an electric circuit, movable means for holding said valve open and operable by a current of predetermined magnitude in said circuit to become ineffective with respect to said valve to permit said valve to function normally, and a second movable means operated by a current of different magnitude in said circuit and adapted to impel said first means to hold said valve in open position.

3. In an electropneumatic device, a valve loaded to a normal position, a solenoid, means for supplying electric current to said solenoid, movable means associated with said solenoid for holding said valve open and operable by a current of predetermined magnitude in said solenoid to cause said movable means to permit said valve to function normally, and a second movable means associated with said solenoid and operable by a current of a different magnitude therein to impel said first movable means to hold said valve in open position.

4. In an electropneumatic device, a check valve, a solenoid, a magnetic circuit associated with said solenoid, means for supplying an electric current to said solenoid to energize said circuit, movable means forming a part of said circuit for holding said valve open and operable by a predetermined current flow in said solenoid to become ineffective with respect to said valve and a second movable means forming a part of said circuit and operable by a different current flow of any polarity in said solenoid to impel said first movable means to hold said valve in open position.

5. In an electropneumatic device, a check valve, a yieldable means for urging said valve to a closed position, an electric circuit, movable means adapted to overcome said yieldable means to hold said valve in open position and operable by a current of predetermined magnitude in said circuit to permit said valve to function normally, a second movable means, second yieldable means for holding said second movable means in one position, the said second movable means being operable by a current of a different magnitude in said circuit to move against the resistance of said first movable means to impel said first movable element to hold said valve open.

6. In an electropneumatic device, a check valve, a solenoid, a magnetic circuit disposed about said solenoid, means for supplying electric current to said solenoid to energize said magnetic circuit, a first movable element forming a part of said circuit disposed axially of said solenoid and associated with said valve and adapted to hold said valve open by its weight, a second movable element forming a part of said circuit and disposed across an end of said solenoid, yieldable means for urging said second movable element away from said solenoid to cause a gap in said circuit, and a magnetic casing surrounding said device and forming a part of said circuit, said yieldable element being of sufficient resistance to require a current of relatively great magnitude to close said gap and the weight of said first movable element being such that a relatively small solenoid exciting current operates said first movable element to become ineffective with respect to said check valve.

7. In an electromagnetic device, a solenoid, means for supplying an electric current to said solenoid, a magnetic circuit disposed about said solenoid, a movable element forming a part of said circuit, yieldable means for urging said element away from said circuit to form a gap therein, the said yieldable means having enough resistance to require a relatively great solenoid exciting current to close said gap and a second movable element urged away from said circuit by gravity to form a gap therein, the said second movable element having such weight that an exciting current of relatively small magnitude is required in said solenoid to move said second element to close said gap.

8. In an electromagnetic device, a solenoid, means for supplying an exciting current to said solenoid, a magnetic circuit disposed about said solenoid, a casing surrounding said device and forming a part of said circuit, a movable element forming a part of said circuit disposed across an end of said device, resilient means urging said movable element away from said circuit to cause a first gap therein between said casing and said movable element, a movable plunger disposed axially of said solenoid, forming a part of said circuit and urged away from said circuit by gravity to form a second gap between it and said armature, the weight of said plunger being such that a solenoid exciting current of relatively small magnitude moves said plunger to close the said second gap and the said resilient means having sufficient resistance to require a solenoid exciting current of relatively great magnitude to close said first gap.

9. In combination, an electric motor, a source of electric current supply, an electric circuit connecting said motor with said source, a load on said motor, means for releasing a part of said load, a solenoid winding interposed in and forming a part of said electric circuit, a magnetic circuit disposed about said solenoid, a first movable element forming a part of said magnetic circuit and associated with said release means and adapted to impel said release means to release said part of said load by means of its weight, the said weight being such that the current required by the normal running of said motor is of sufficient magnitude to energize said magnetic circuit to move said first movable element out of association with said release means, a second movable element forming a part of said magnetic circuit and resilient means for urging said second movable element away from said circuit, the said resilient means being of such strength to require the current of relatively great magnitude required by said motor during the starting to energize said circuit sufficiently to move said second movable element to cause said release means to function to release said part of said load.

10. In an electromagnetic device, a solenoid winding, a plunger disposed therein and movable axially, a movable armature disposed across an end of said winding, the said plunger and said armature each requiring a different exciting current of any polarity in said solenoid winding to be operated.

11. In an electromagnetic device, a solenoid winding, a plunger disposed therein and movable axially, a movable armature disposed across an end of said winding, the said plunger and said armature each requiring a different exciting current of any polarity in said solenoid winding to be operated, and a fluid controlling valve operated by said plunger.

12. In combination, an electric circuit including an electric motor, a source of electrical power, and a solenoid winding, a load for said motor, a magnetic circuit disposed about said solenoid and comprising a first movable element normally tending to release said motor load, and adapted to load said motor when said magnetic unit is energized by the normal running current of said motor, and a second movable element adapted to operate said first movable element to release said motor load and responsive to an electric current in said electric circuit relatively greater than the said normal running current of said motor.

13. In combination, an electric circuit comprising an electric motor and a solenoid winding, a magnetic circuit disposed about said solenoid winding and comprising a plurality of movable members normally forming two magnetic gaps in said magnetic circuit, a load on said motor, and motor load controlling means associated with said movable member and adapted to release a part of said motor load when both said gaps are closed and when both said gaps are open, and to load said motor when only one of said gaps is opened.

14. In combination, an electric circuit including an electric motor, a source of electric power and an electromagnetic device, a fluid load for said motor, a valve for controlling said fluid, the said electromagnetic device comprising a first movable member associated with said valve and adapted to normally hold said valve to release said fluid load on the motor and responsive to the normal running current of said electric motor to permit said valve to load said motor, and a second movable element in said electro-magnetic device associated with said first movable element and responsive to motor overload and starting current in said electric circuit to actuate said valve and unload said motor.

In witness whereof, I hereunto subscribe my name this 21st day of June, 1922.

BURTON S. AIKMAN.